(12) United States Patent
Sivakumar

(10) Patent No.: US 10,597,242 B1
(45) Date of Patent: Mar. 24, 2020

(54) SPRING ASSIST ASSEMBLY FOR A LEVELER LIP PLATE

(71) Applicant: Blue Giant Equipment Corporation, Mississauga (CA)

(72) Inventor: Elanchchelvi Sivakumar, Brampton (CA)

(73) Assignee: Blue Giant Equipment Corporation, Mississauga (CA)

( * ) Notice: Subject to any disclaimer, the term of this patent is extended or adjusted under 35 U.S.C. 154(b) by 0 days.

(21) Appl. No.: 16/227,600

(22) Filed: Dec. 20, 2018

(51) Int. Cl.
*E01D 1/00* (2006.01)
*B65G 69/28* (2006.01)

(52) U.S. Cl.
CPC ................ *B65G 69/2841* (2013.01)

(58) Field of Classification Search
USPC ........................ 14/69.5, 71.1, 71.3
See application file for complete search history.

(56) References Cited

U.S. PATENT DOCUMENTS

| | | | | |
|---|---|---|---|---|
| 2,592,919 A * | 4/1952 | Loomis | ............. | B65G 69/2858 14/71.3 |
| 2,798,620 A * | 7/1957 | Allan | ................ | B65G 69/2817 414/584 |
| 3,137,876 A * | 6/1964 | Loomis | ............. | B65G 69/2841 14/71.3 |
| 3,199,140 A * | 8/1965 | McKnight | ............. | E05F 1/1261 105/425 |
| 3,203,002 A * | 8/1965 | McGuire | ............ | B65G 69/2841 14/71.3 |
| 3,411,168 A * | 11/1968 | Hecker, Jr. | ......... | B65G 69/2841 14/71.3 |
| 3,539,118 A * | 11/1970 | Kueneman | ............. | B02C 2/045 241/207 |
| 3,584,324 A | 6/1971 | Merrick | | |
| 3,763,514 A | 10/1973 | Bishop | | |
| 3,982,295 A * | 9/1976 | Burnham | ........... | B65G 69/2841 14/71.3 |
| 4,665,579 A * | 5/1987 | Bennett | ............. | B65G 69/2841 14/71.1 |
| 4,803,673 A * | 2/1989 | Hepfer | .................. | G04B 21/06 368/269 |
| 4,928,340 A * | 5/1990 | Alexander | ........... | B65G 69/287 14/71.3 |
| 5,214,818 A * | 6/1993 | Cook | ................ | B65G 69/2841 14/71.1 |
| 5,303,443 A | 4/1994 | Alexander | | |
| 5,598,595 A | 2/1997 | Flinchum | | |
| 5,784,740 A * | 7/1998 | DiSieno | ............. | B65G 69/2841 14/71.3 |
| 6,061,859 A * | 5/2000 | Winter | ............... | B65G 69/2841 14/69.5 |

(Continued)

*Primary Examiner* — Thomas B Will
*Assistant Examiner* — Katherine J Chu
(74) *Attorney, Agent, or Firm* — Price Heneveld LLP

(57) ABSTRACT

A dock leveler includes a lip plate that is rotationally attached to an edge of a deck at a hinge and operable between raised and lowered positions. A spring assist assembly extends between the deck and the lip plate. The spring assist assembly includes a plurality of springs that linearly operate along respective calibrating posts to bias the lip plate toward the raised position. A base end and a compression end of each spring are adjustable along the respective calibrating posts.

20 Claims, 7 Drawing Sheets

(56) References Cited

U.S. PATENT DOCUMENTS

| | | | | |
|---|---|---|---|---|
| 6,112,353 | A * | 9/2000 | Winter | B65G 69/2841 14/69.5 |
| 6,125,491 | A * | 10/2000 | Alexander | B65G 69/2841 14/69.5 |
| 6,311,352 | B1 * | 11/2001 | Springer | B65G 69/2823 14/69.5 |
| 6,739,011 | B1 * | 5/2004 | Brouillette | B65G 69/001 14/69.5 |
| 6,988,289 | B2 * | 1/2006 | Pedersen | B65G 69/2841 14/69.5 |
| 7,913,341 | B1 * | 3/2011 | Morris | A61G 3/061 14/71.1 |
| 8,407,842 | B2 * | 4/2013 | Story | B65G 69/2841 14/71.1 |
| 9,457,923 | B2 * | 10/2016 | Lam | B65H 23/14 |
| 2002/0092101 | A1 * | 7/2002 | Lounsbury | B65G 69/2841 14/71.1 |
| 2004/0117927 | A1 * | 6/2004 | Gleason | B65G 69/2835 14/71.3 |
| 2004/0237223 | A1 * | 12/2004 | Hoofard | B65G 69/2835 14/71.1 |
| 2005/0150065 | A1 * | 7/2005 | Muhl | B65G 69/2894 14/71.3 |
| 2006/0042030 | A1 * | 3/2006 | Yoon | B65G 69/2841 14/71.1 |
| 2011/0181094 | A1 * | 7/2011 | Lawson | A47C 1/035 297/85 R |
| 2011/0220304 | A1 * | 9/2011 | Diaz | E05D 13/1261 160/191 |
| 2016/0346940 | A1 * | 12/2016 | Bax | B25J 19/0016 |
| 2017/0000254 | A1 * | 1/2017 | Matlin | A47B 9/16 |

\* cited by examiner

SPRING ASSIST ASSEMBLY FOR A LEVELER LIP PLATE

FIELD OF THE INVENTION

The present invention generally relates to dock levelers, and more specifically, a leveler lip plate having a spring assist assembly that includes a plurality of biasing members that act on a single actuator for operating the lip plate.

BACKGROUND OF THE INVENTION

Within loading docks and various other loading and unloading areas and structures, dock levelers are typically used for providing convenient access into cargo vehicles. These dock levelers can include lip plates, deck plates, elevating docks, and other similar mechanisms that are rotationally operable to provide a convenient transitioning surface between the interior cargo area of the vehicle and a loading dock area within a structure. Certain dock levelers are biased in a generally upward direction in order to counteract the weight of the dock leveler. These biasing mechanisms serve to allow for convenient lifting of the dock leveler from a lowered position to a raised position. These biasing mechanisms also provide for a smooth return rotation from the raised position to the lowered position to prevent damage to the vehicle, dock leveler or the structure surrounding the dock leveler.

SUMMARY OF THE INVENTION

According to one aspect of the present invention, a dock leveler includes a lip plate that is rotationally attached to an edge of a deck at a hinge and operable between raised and lowered positions. A spring assist assembly extends between the deck and the lip plate. The spring assist assembly includes a plurality of springs that linearly operate along respective calibrating posts to bias the lip plate toward the raised position. A base end and a compression end of each spring are adjustable along the respective calibrating posts.

According to another aspect of the present invention, a dock leveler includes a lip plate that is rotationally attached to a deck and defines a rotational path between raised and lowered positions. A spring assist assembly extends between the deck and the lip plate and including a plurality of springs that linearly operate to bias the lip plate toward the raised position. A base end and a compression end of each spring are adjustable along respective calibrating posts. Calibration of the base end for each spring of the plurality of springs defines a sequenced engagement of the plurality of springs with respect to the rotational path. Calibration of the compression ends of the plurality of springs defines a sequenced biasing force of the plurality of springs with respect to the rotational path. The sequenced engagement and the sequenced biasing force cooperatively defines a substantially consistent upward rotational force exerted by the lip plate through the rotational path and toward the raised position.

According to another aspect of the present invention, a method for operating a dock leveler includes attaching a spring assist assembly to a lip plate and a deck plate for the dock leveler. The lip plate is rotationally operable relative to the deck plate through a rotational path between lowered and raised positions. A base end of a first spring is adjusted to define a first engagement position with respect to the rotational path. A base end of a second spring is adjusted to define a second engagement position with respect to the rotational path. The second engagement position is different than the first engagement position. At least the first and second engagement positions cooperatively define a sequenced engagement of the spring assist assembly. A compression end of the first spring is adjusted to define a first biasing profile with respect to the rotational path. A compression end of the second spring is adjusted to define a second biasing profile with respect to the rotational path. The second biasing force is different than the first biasing force. At least the first and second biasing profiles cooperatively define a sequenced biasing engagement of the spring assist assembly. The sequenced engagement and the sequenced biasing engagement cooperatively define a substantially consistent upward rotational force exerted by the lip plate through the rotational path and toward the raised position.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
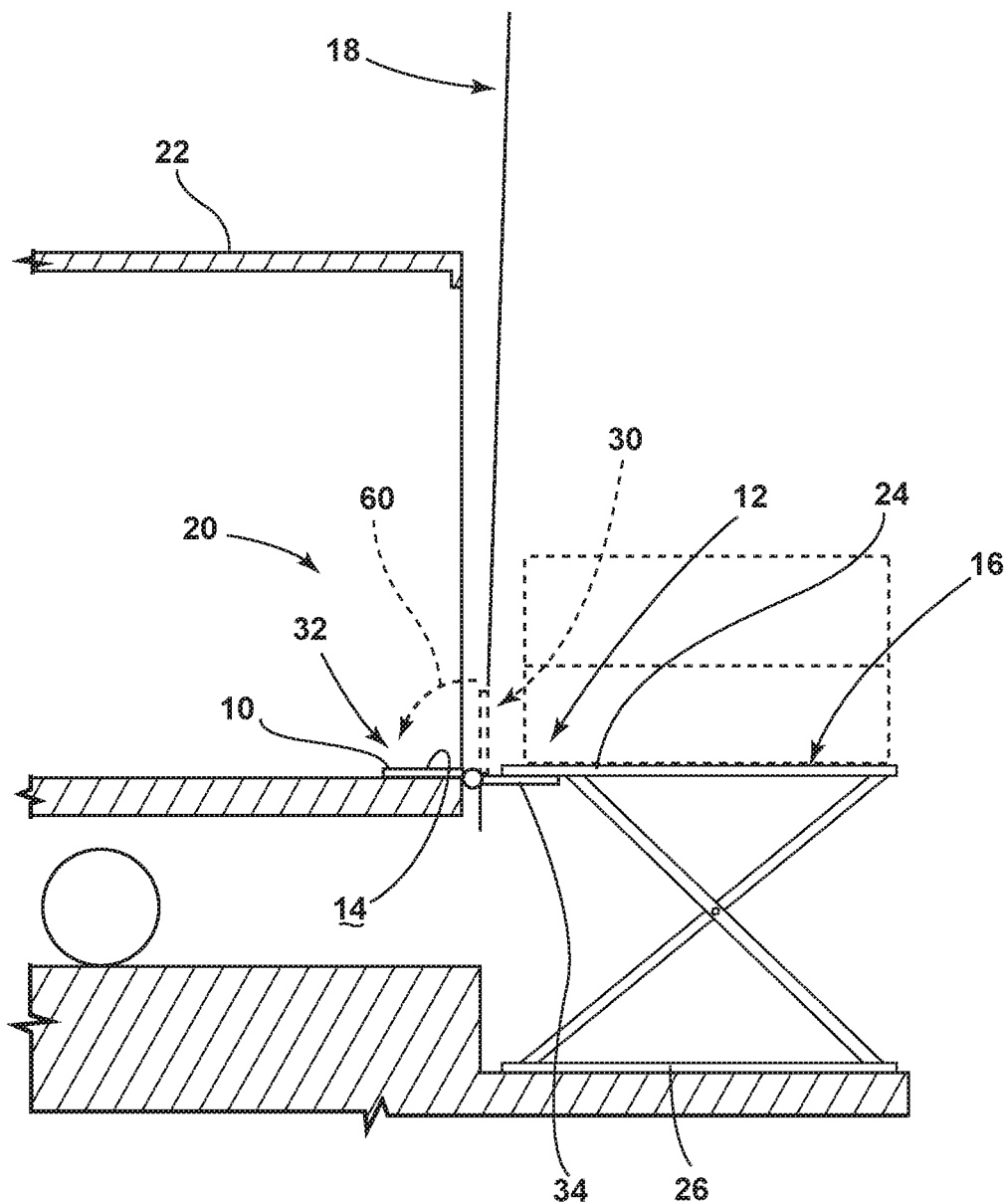
FIG. 1 is a cross-sectional view of a loading dock incorporating a lip plate having an aspect of a spring assist assembly.
Figure 2:
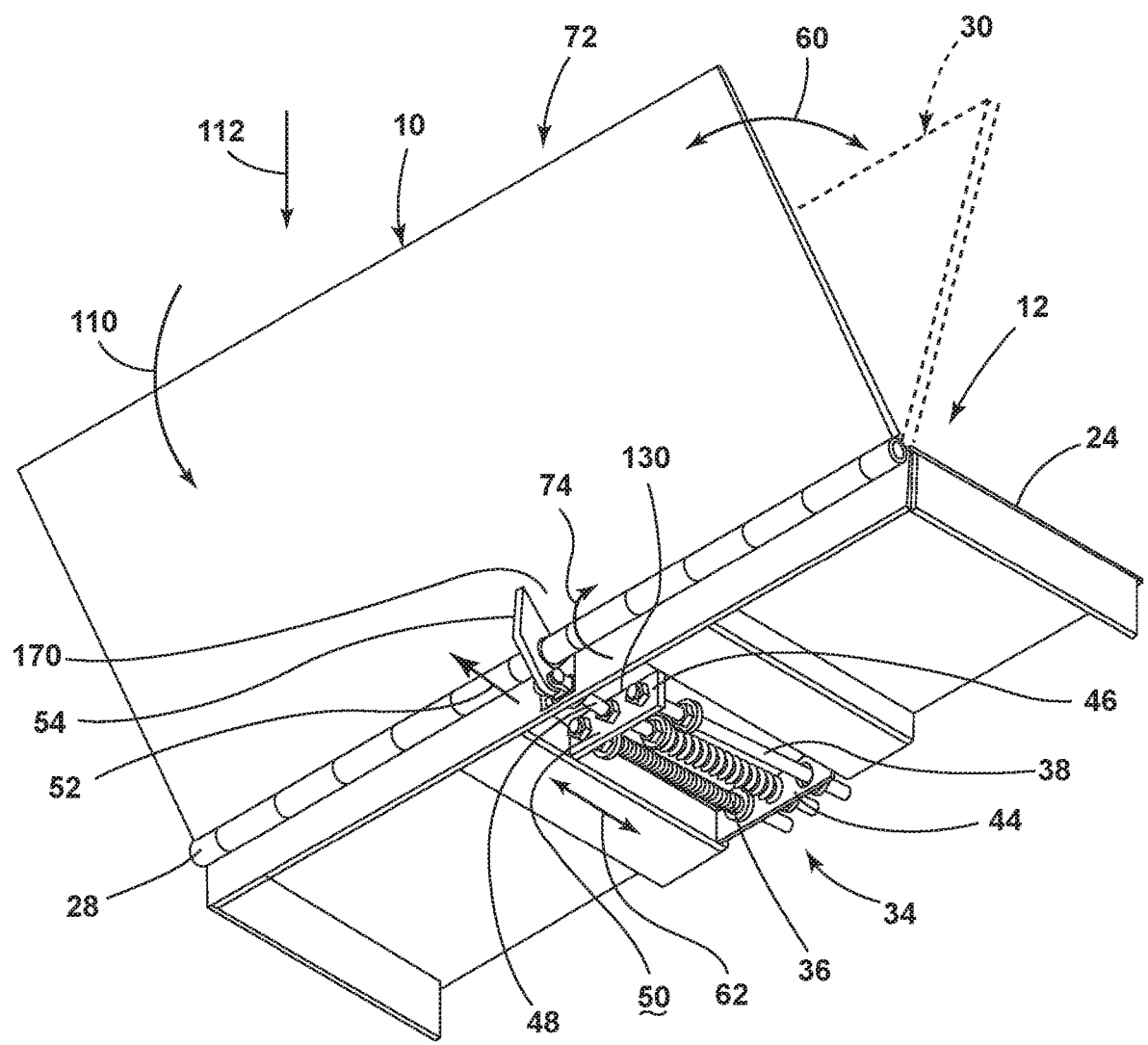
FIG. 2 is a bottom perspective view of a dock leveler lip plate that incorporates an aspect of a spring assist assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-6, reference numeral 10 generally refers to a lip plate for an elevating dock leveler 12 that is rotationally operable for defining a transition surface 14 between a loading dock area 16 of the structure 18 and the interior areas 20 of a cargo vehicle 22. According to various aspects of the device, the dock leveler 12 can include a deck 24 that is part of an elevating dock, or can be rotationally coupled to a frame 26. The lip plate 10 is rotationally attached to an edge of the deck 24 at a hinge 28 and is operable between raised and lowered positions 30, 32. In various aspects of the device, the deck 24 may be secured to the frame 26 such that the lip plate 10 is the only or primary rotationally operable component of the dock leveler 12. A spring assist assembly 34 extends between the deck 24 and the lip plate 10. The spring assist assembly 34 includes a plurality of springs 36 that linearly operate along respective calibrating posts 38 to bias the lip plate 10 towards the raised position 30. It is contemplated that a base end 40 and a compression end 42 of each spring 36 are adjustable along the respective calibrating posts 38. The spring assist assembly 34 includes a base plate 44 that is coupled to the deck 24 and a biasing plate 46 that is coupled to the respective calibrating posts 38. A linkage member 48 extends from an outward surface 50 of the biasing plate 46 and rotationally attaches to the lip plate 10. Accordingly, operation of the lip plate 10 between the raised and lowered positions 30, 32 results in the spring assist assembly 34 biasing the lip plate 10 towards the raised position 30. This biasing force 52 is provided by the plurality of springs 36 that press against the base plate 44 and bias the linkage member 48 away from the base plate 44 to move the lip plate 10 to the raised position 30. While the various aspects of the device include a plurality of springs 36, these plurality of springs 36 cooperatively operate a single linkage member 48 that extends from an outward surface 50 of the biasing plate 46 to the lip plate 10.

Referring again to FIGS. 1-6, operation of the lip plate 10 between the raised and lowered positions 30, 32 defines a rotational path 60 of the lip plate 10. Simultaneously, a linear path 62 of the plurality of springs 36 and the respective calibrating posts 38 further defines operation of the lip plate 10 between the raised and lowered positions 30, 32. Accordingly, the rotational path 60 of the lip plate 10 corresponds to the linear path 62 of the plurality of springs 36 and respective calibrating posts 38. In this manner, the biasing force 52 exerted by the plurality of springs 36 directly corresponds to the rotational path 60 of the lip plate 10 between the raised and lowered positions 30, 32.

Referring again to FIGS. 2-6, in order to adjust the biasing force 52 exerted by the spring assist assembly 34, calibration of the base end 40 for each spring 36 of the plurality of springs 36 serves to define a sequenced engagement 70 of the plurality of springs 36 with respect to the linear path 62 and the rotational path 60. In this manner, the base end 40 for each of the springs 36, which is located proximate the base plate 44 of the spring assist assembly 34, is calibrated so that each spring 36 engages the base plate 44 at a particular rotational position 72 of the rotational path 60. Accordingly, calibration of the base ends 40 for each of the springs 36 defines the sequenced engagement 70 of the plurality of springs 36 to be engaged with the base plate 44 at specific locations of the lip plate 10 as it rotates about the hinge 28 and along the rotational path 60. This sequenced engagement 70 of the plurality of springs 36 is intended to at least partially calibrate the upward biasing force 52 exerted by the spring assist assembly 34 to be a substantially consistent upward biasing force 74.

Referring again to FIGS. 2-6, in addition to the sequenced engagement 70 that can be set by calibration of the base ends 40 for each of the springs 36, the plurality of springs 36 can also be adjusted at the compression ends 42 that are located proximate the biasing plate 46 for the spring assist assembly 34. Calibration of the compression ends 42 for the plurality of springs 36 serves to define a sequenced biasing engagement 82 of the plurality of springs 36 with respect to the linear path 62 as well as the rotational path 60. Typically, the springs 36 will be in the form of compression springs 36 that are adapted to surround a respective calibrating post 38 of the spring assist assembly 34. The compression springs 36 are configured such that the springs 36 exert a progressively greater biasing force 52 as the springs 36 become more and more compressed within the spring assist assembly 34. By adjusting the compression end 42 of each spring 36, each of the springs 36 can be calibrated to exert a greater biasing force 52 in a linear direction and along the respective calibrating posts 38. This linear biasing force 52 is then translated through the linkage member 48 and into the lip plate 10. Using this linkage member 48, the axially exerted biasing force 52 of the compression springs 36 can be converted to a rotational biasing force 52 between a connection of the linkage member 48 of the spring assist assembly 34 and a linkage plate 54 of the lip plate 10 that serves to rotationally attach to the linkage member 48.

Figure 3:
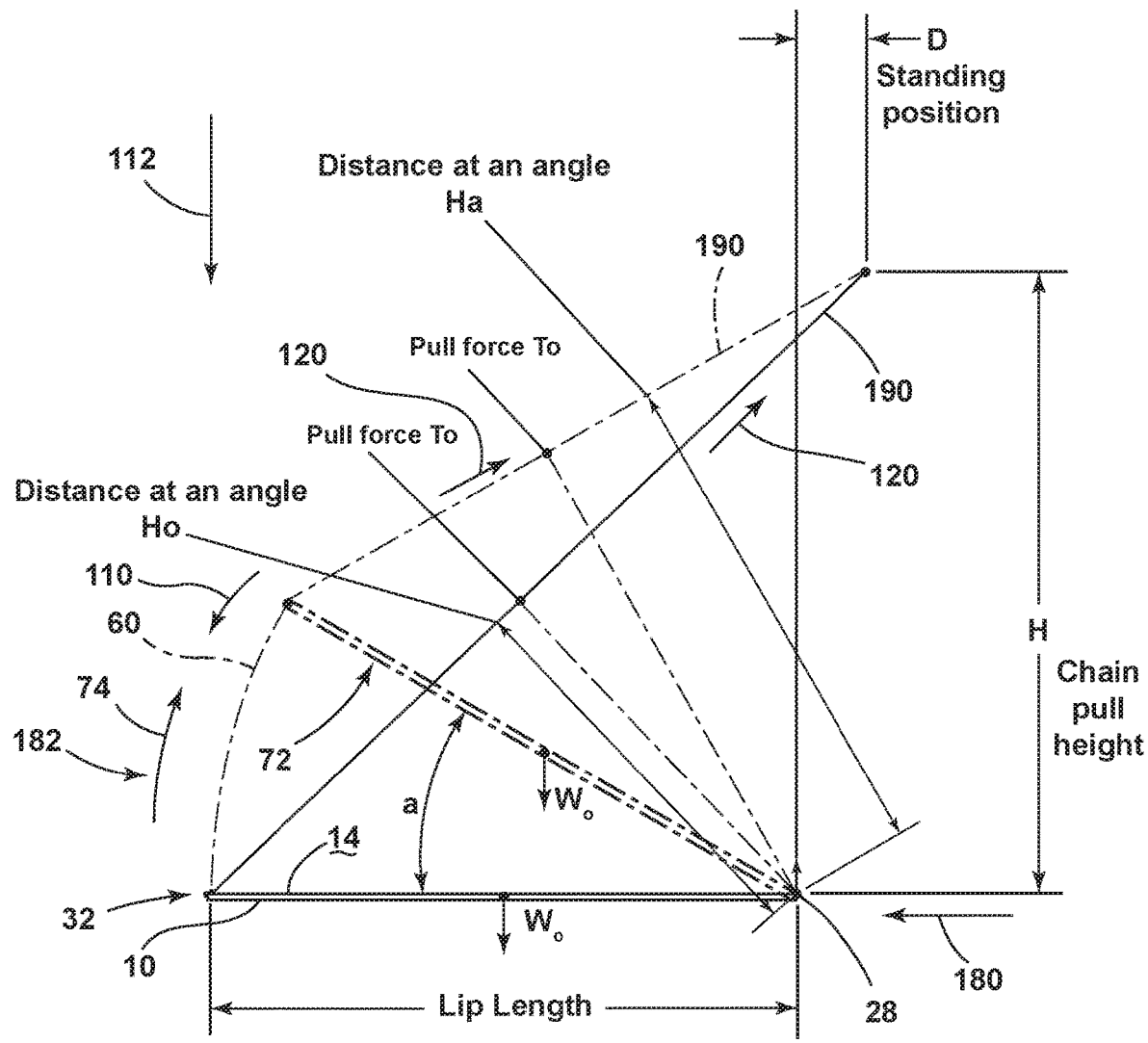
FIG. 3 is a schematic diagram illustrating a rotational operation of the lip plate with respect to a loading dock surface.
Figure 4:
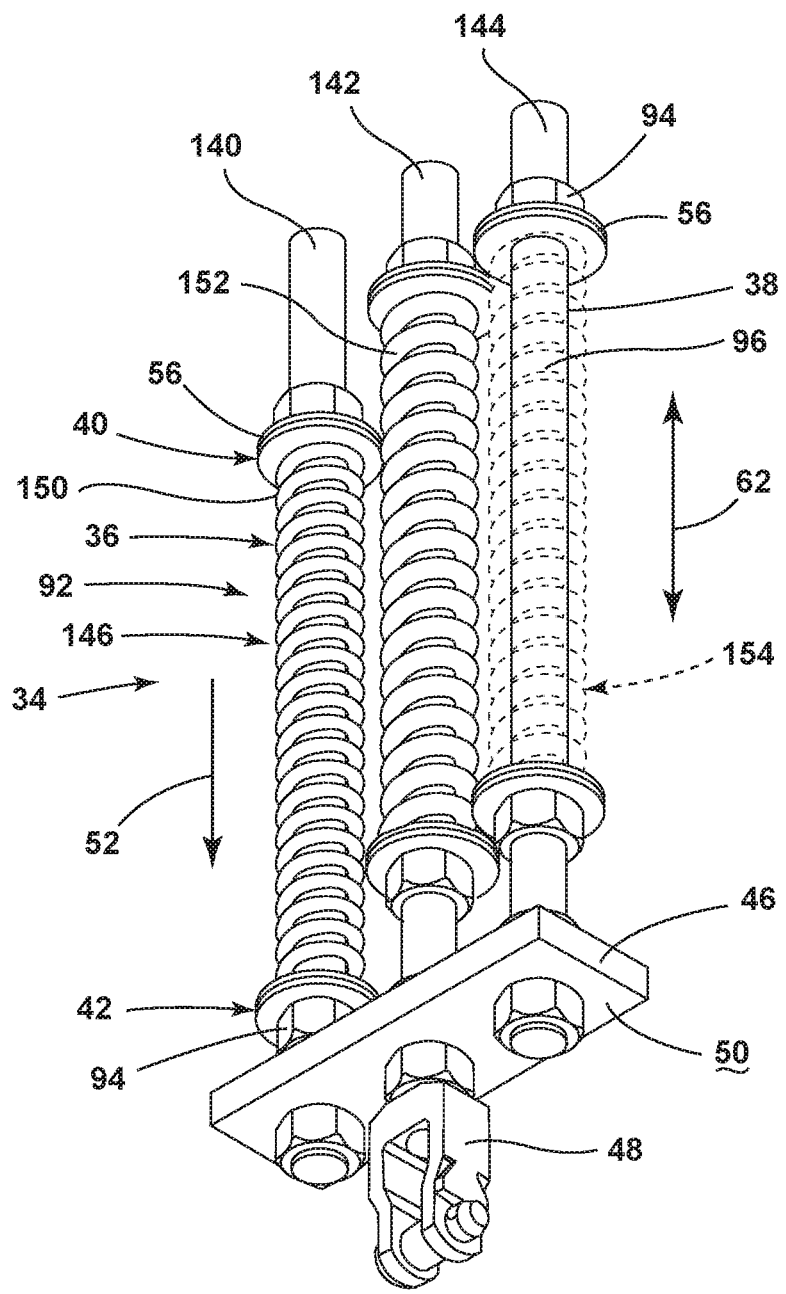
FIG. 4 is a side perspective view of an aspect of the spring assist assembly.
Figure 5:
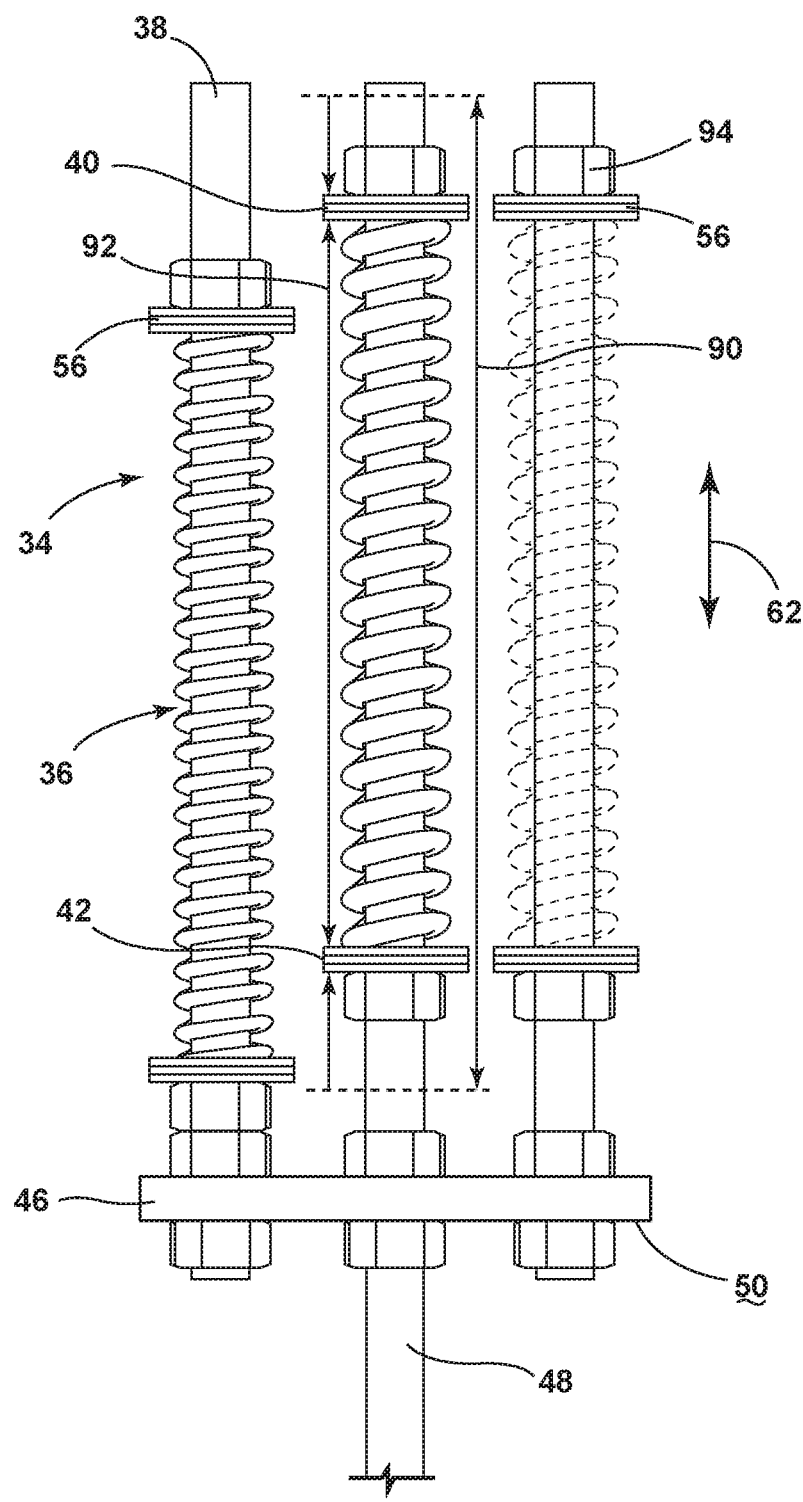
FIG. 5 is a plan view of an aspect of the spring assist assembly and showing operation of the various spring members to define a consistent overcoming force for operating the lip plate.
Figure 6:
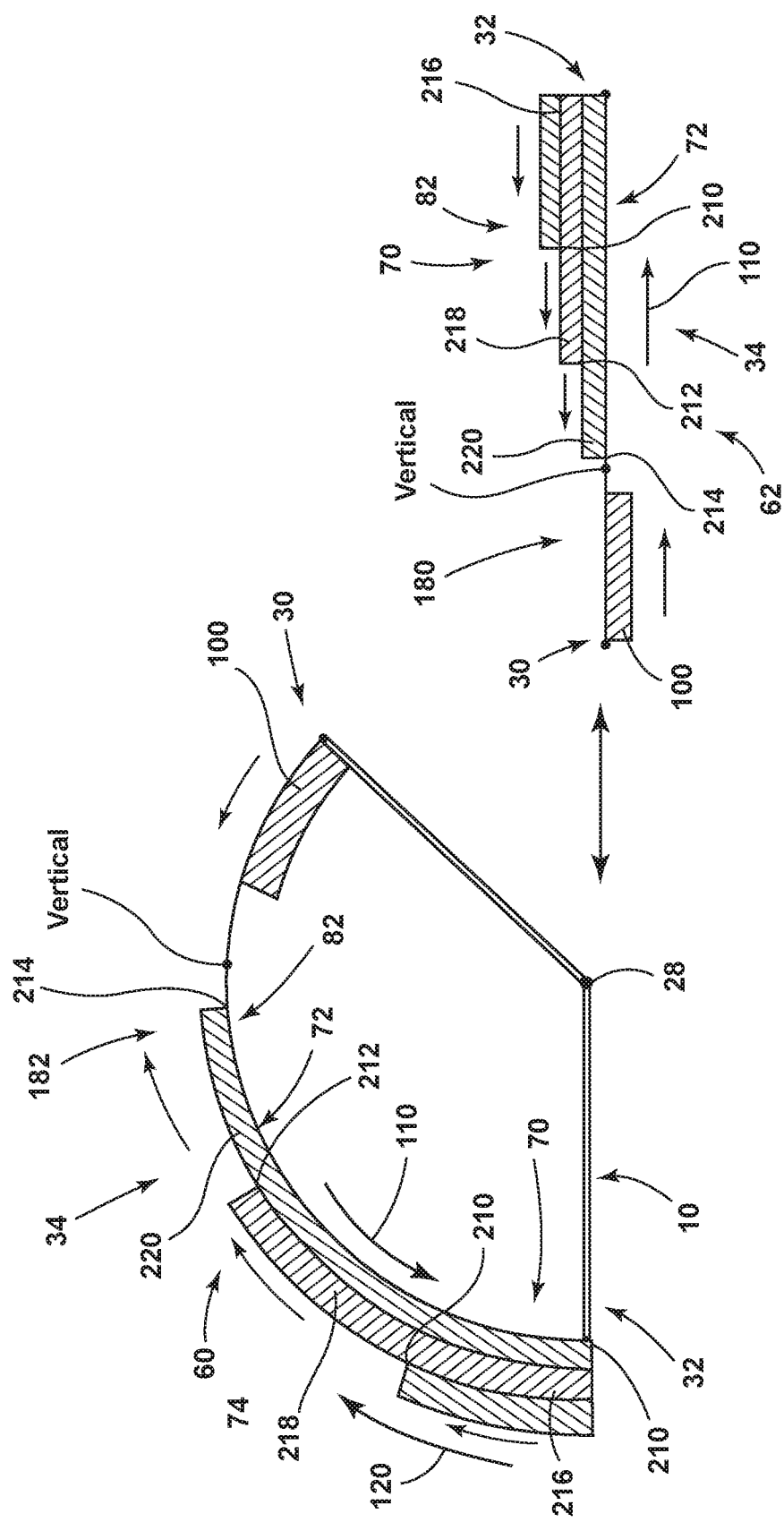
FIG. 6 is a schematic diagram illustrating aspects of the sequenced arrangement of the plurality of springs as well as the sequenced biasing force of the plurality of springs generated by the spring assist assembly.
Figure 7:
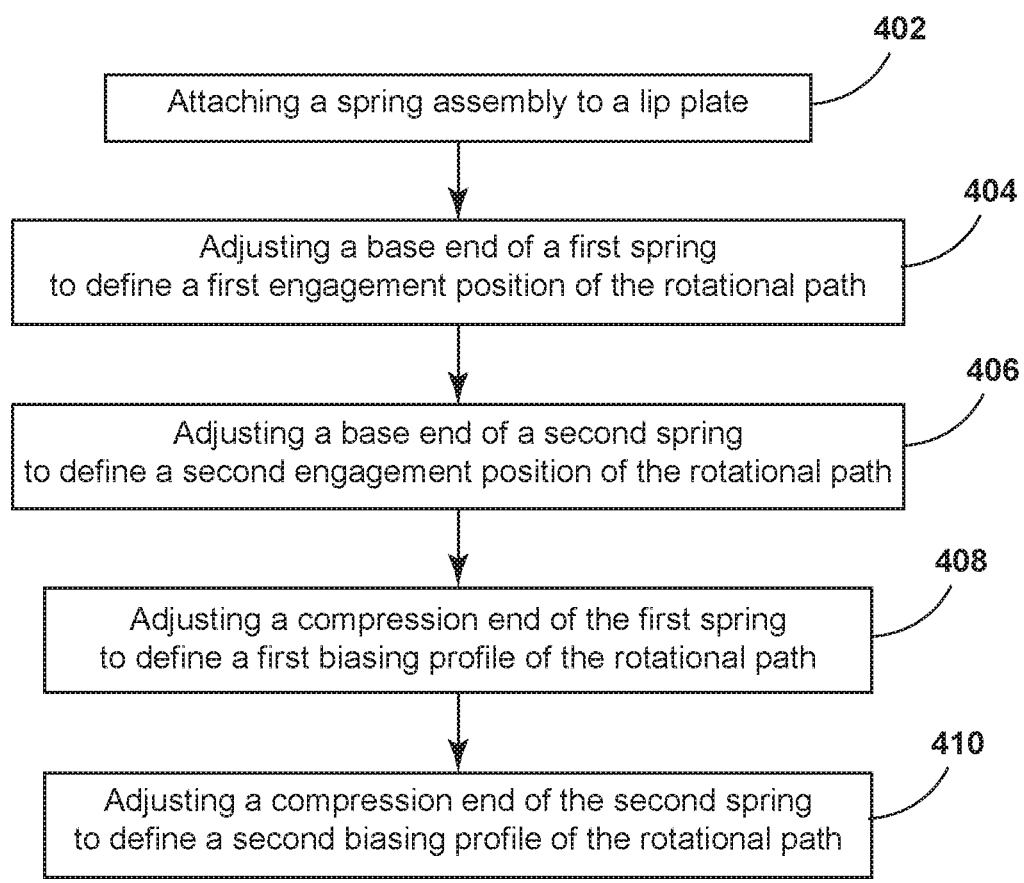
FIG. 7 is a schematic flow diagram illustrating a method for operating a dock leveler lip plate.

According to various aspects of the device, as exemplified in FIGS. 3-5, each spring 36 of the plurality of springs 36 can include a base length 90 that is defined by the length of each spring 36 at rest. Through operation of the compression end 42 for each of the springs 36, the base length 90 of the spring 36 can be adjusted to an effective length 92 of each spring 36. Adjustment of each spring 36 can occur through a threaded mechanism 94 that can be positioned at each of the base end 40 and compression end 42 for each spring 36. According to various aspects of the device, the threaded mechanisms 94 can be rotationally attached at each end of the spring 36. Operation of the threaded mechanisms 94 for each spring 36 can operate along a threaded rod 96 that defines each respective calibrating post 38 for the spring assist assembly 34. Operation of the threaded mechanisms 94 of each spring 36 can adjust the base length 90 to the effective length 92 or change the effective length 92. While a threaded rod is described above, it should be understood that other mechanisms can be utilized for setting the effective length 92 of the springs 36. Such mechanisms can include, but are not limited to, spacers, slots, pins, various mating engagements, and other similar mechanical connections.

In various aspects of the device, the base plate 44 can include apertures through which the threaded mechanisms 94 at each base end 40 of the springs 36 can travel. Each base end 40 also includes an enlarged washer 56 that is larger than the aperture in the base plate 44. During operation of the lip plate 10 from the raised position 30 to the lowered position 32, the washers 56 will progressively and sequentially engage the base plate 44. The calibrating posts 38 and the threaded mechanism 94 will pass through the base plate 44 at the apertures. However, the washer 56 will prevent the springs 36 from passing therethrough. Through this configuration, the base plate 44 engages the washers 56 and biases the springs 36 to compress the springs 36. The springs 36, in turn, exert the biasing force 52 in the direction of the biasing plate 46.

In certain aspects of the device, the effective length 92 is typically less than the base length 90 so that the biasing force 52 exerted by each spring 36 can be increased, as needed for defining the consistent upward biasing force 74 that can be exerted upon the lip plate 10. In certain aspects, the threaded mechanisms 94 for the various springs 36 can be adjusted to make the effective length 92 of the spring 36 greater than, or longer than, the base length 90. In such an embodiment, this spring 36 may exert a negative biasing force 100 in a direction away from the lip plate 10. This negative biasing force 100 is typically operated in conjunction with a positive biasing force 52 of one of the other springs 36 of the spring assist assembly 34. Through the calibration of the various biasing forces 52 of the springs 36 for the spring assist assembly 34, the sequenced biasing engagement 82 of the plurality of springs 36 can be used to generate the consistent upward biasing force 74 for operating the lip plate 10 toward the raised position 30.

Referring again to FIGS. 2-6, the spring assist assembly 34 is configured to be operated in connection with lip plates 10 of varying sizes. By way of example, and not limitation, certain lip plates 10 may have a significant amount of weight that may place a downward torque 110 of approximately 16,000 pound inches of torque at the hinge 28. This downward torque 110 of the lip plate 10 that is generated by gravity 112 is exerted toward the lowered position 32. The spring assist assembly 34 is used to exert the biasing force 52 toward the raised position 30. By operating each spring 36 at the base end 40 and the compression end 42, the sequenced engagement 70 of the plurality of springs 36 and the sequenced biasing engagement 82 of the plurality of springs 36 can be calibrated to exert the substantially consistent upward biasing force 74 that opposes this downward torque 110 of the lip plate 10. The resulting effect of the weight, or downward torque 110, of the lip plate 10 in connection with the upward biasing force 52 exerted by the spring assist assembly 34 is the lip plate 10 being able to be moved from the lowered position 32 to the raised position 30 through the exertion of a relatively minimal amount of pulling force by a user.

In various aspects of the device, the spring assist assembly 34 exerts a biasing force 52 that is slightly less, in opposition, than the downward torque 110 exerted by the weight of the lip plate 10. This results in an overcoming force 120, typically a pulling force, that can be exerted by a user for moving the lip plate 10 from the lowered position 32 to the raised position 30. In various aspects of the device, the spring assist assembly 34 can be calibrated to provide a substantially consistent overcoming force 120 of approximately 40 pounds. Stated another way, regardless of the rotational position 72 of the lip plate 10 with respect to the hinge 28, an overcoming force 120 of approximately 40 pounds can be applied to the lip plate 10 for moving the lip plate 10 in a rotationally upward direction toward the raised position 30. This overcoming force 120 that is generated through the cooperative opposition of the weight of the lip plate 10 and the biasing force 52 exerted by the spring assist assembly 34 can be calibrated to arrive at various overcoming forces 120 as desired by the user of the dock leveler 12.

According to various aspects of the device, the spring assist assembly 34 is intended to be used on standard lip plate levelers and other lip plates 10 within loading dock applications. It is contemplated that the spring assist assembly 34 can be used to replace hydraulic systems, and other "powered" systems that may use hydraulics, electricity, pneumatics, and other similar powered systems for moving the lip plate 10 relative to the deck 24. The attachment points 130 of the spring assist assembly 34 are configured to be similar to those of the powered systems. Accordingly, the powered systems can be removed such that the spring assist assembly 34 can be replaced and used as a manual replacement for these powered systems.

Referring again to FIGS. 2-6, the spring assist assembly 34 can include a plurality of calibrating posts 38. Each calibrating post 38 can correspond to a separate spring 36 having a base end 40 and a compression end 42 that can be adjusted to modify the effective length 92 of the particular spring 36. In various aspects of the device, the spring assist assembly 34 can include first, second and third calibrating posts 140, 142, 144. As discussed above, these calibrating posts 38 are typically in the form of threaded rods 96 that allow for threaded manipulation of the threaded mechanisms 94 that are attached to each of the base end 40 and compression end 42 for the various springs 36. Typically, the calibrating posts 38 are set in parallel configuration with respect to one another and are also substantially perpendicular in orientation with respect to the base plate 44. In this manner, each of the springs 36 can operate along the calibrating posts 38 and also act perpendicular to the base plate 44 for the spring assist assembly 34.

Referring again to FIGS. 2-6, the various calibrating posts 38 can be linked with a dedicated spring 36 of the plurality of springs 36. In certain applications, typically in the form of smaller lip plates 10, a spring assist assembly 34 having three calibrating posts 38 may only require two springs 36, where one of the calibrating posts 38 remain idle. It is also contemplated that the spring assist assembly 34 can include several springs 36, and potentially more springs 36 than the number of calibrating posts 38 for the particular spring assist assembly 34. In such an embodiment, the user can select the springs 36 having the proper compression characteristics 146 for use on respective calibration posts. The selection of the springs 36 can depend upon the particular dock leveler 12 application within which the spring assist assembly 34 is being used.

Referring again to FIGS. 1-6, the lip plate 10 for the dock leveler 12 can be coupled to the deck 24. The lip plate 10 is rotationally attached to the deck 24 and defines a rotational path 60 between raised and lowered positions 30, 32 as the lip plate 10 rotates about a hinge 28 that is attached to the deck 24. The spring assist assembly 34 extends between the deck 24 and the lip plate 10 and includes a plurality of springs 36 that linearly operate to bias the lip plate 10 toward the raised position 30.

According to various aspects of the device, the base end 40 and the compression end 42 of each spring 36 are independently and selectively adjustable along the respective calibrating posts 38. As discussed above, a threaded mechanism 94 is attached to each of the base end 40 and compression end 42 for threadedly adjusting the spring 36 along the threaded rod 96 of the calibrating post 38. Calibration of the base end 40 for each spring 36 of the plurality of springs 36 defines a sequenced engagement 70 of the plurality of springs 36 with respect to the rotational path 60. In this manner, when the lip plate 10 is in the lowered position 32, only a portion of the springs 36 of the plurality of springs 36 may be engaged with the base plate 44 for the spring assist assembly 34.

In certain aspects, a single first spring 150 could provide the only linear biasing force 52 for the spring assist assembly 34 at the lowered position 32 and biasing the lip plate 10 towards the raised position 30. As the lip plate 10 moves toward the raised position 30, a second spring 152, at some predetermined rotational position 72 within the rotational path 60, may become engaged with the base plate 44 and add additional biasing force 52 that is exerted against the lip plate 10 for moving the lip plate 10 towards the raised position 30. Where a third spring 154 is included in the spring assist assembly 34, the third spring 154 may engage the base plate 44 at another distinct location or rotational position 72 along the rotational path 60 of the lip plate 10 and the corresponding linear path 62 of the spring assist assembly 34. In this manner, the engagement of the various springs 36 for applying the biasing force 52 to the lip plate 10 can be calibrated to define a sequenced engagement 70 of the plurality of springs 36 with respect to the rotational path 60 and the linear path 62. It is also contemplated that all of the springs 36 can provide a biasing force 52 when the lip plate 10 is in the lowered position 32. In such an embodiment, as the lip plate 10 moves to the raised position 30, certain springs 36 will cease to provide a biasing force 52.

Additionally, calibration of the compression ends 42 of the plurality of springs 36 also defines the sequenced biasing engagement 82 of the plurality of springs 36 with respect to the rotational path 60. By manipulating the compression ends 42 at each spring 36, the biasing force 52 exerted by each spring 36 can be calibrated, such that when each spring 36 engages the base plate 44 for the spring assist assembly 34, a particular biasing force 52 can be exerted to assist in biasing the lip plate 10 toward the raised position 30. Each of the springs 36 of the plurality of springs 36 for the spring assist assembly 34 may be calibrated to a different biasing force 52 or compressive force that can assist in moving the lip plate 10 toward the raised position 30. Using the calibration of the base ends 40 and the compression ends 42 for the plurality of springs 36, the sequenced engagement 70 and the sequenced biasing engagement 82 cooperatively define a substantially consistent upward rotational force that is exerted against the lip plate 10 by the spring assist assembly 34 through the rotational path 60 and toward the raised position 30. As discussed above, this biasing force 52 that is exerted against the lip plate 10 is generated through the linear operation of the calibrating posts 38 and the plurality of springs 36 for the spring assist assembly 34.

Referring again to FIGS. 2-5, the biasing plate 46 for the spring assist assembly 34 is adapted to link the calibrating posts 38 together. The biasing plate 46 is configured to transfer the linear biasing forces 52 of the plurality of springs 36 that is exerted along each of the calibrating posts 38 and focus these biasing forces 52 along the single linkage member 48 that extends from the spring assist assembly 34 to the lip plate 10. According to various aspects of the device, the linkage member 48 may be an extension of one of the calibrating posts 38. However, in such an embodiment, the biasing plate 46 is configured such that each calibrating post 38 is able to cooperatively exert the biasing force 52 at different rotational positions 72 of the rotational path 60, into the biasing plate 46 and toward the lip plate 10. The linkage member 48 of the spring assist assembly 34 can extend to the linkage plate 54 that is coupled with an underside 170 of the lip plate 10. This linkage plate 54 can extend downward from the lip plate 10 such that the biasing force 52 exerted by the spring assist assembly 34 can be linearly or substantially linearly exerted to bias the lip plate 10 toward the raised position 30. In various aspects of the device, the linkage plate 54 may extend at least partially around the hinge 28 for the lip plate 10. Accordingly, the linkage plate 54 can be used to efficiently transfer the linear component 180 of the biasing force 52 exerted by the spring assist assembly 34 into the rotational component 182 of the biasing force 52 that is exerted against the lip plate 10 towards the raised position 30.

According to various aspects of the device, the lip plate 10 can be operated by a user through various operating mechanisms 190. Such operating mechanisms 190 can include, but are not limited to, a chain attached to the lip plate 10, a lever attached to the lip plate 10, and various other manually-configured operating mechanisms 190 that can be used to pull the lip plate 10 from the lowered position 32 and to the raised position 30. As discussed above, the amount of overcoming force 120 exerted through the manual operating mechanism 190 is configured to be a substantially consistent overcoming force 120 exerted by the user. As discussed above, this consistent overcoming force 120 is calibrated through operation and calibration of the various springs 36 of the spring assist assembly 34.

According to various aspects of the device, the plurality of springs 36 are typically configured to exert a greater biasing force 52 when the lip plate 10 is near the lowered position 32. Based upon the configuration of the lip plate 10 in the lowered position 32, a greater amount of biasing force 52 is necessary to overcome the greater amount of downward torque 110 that is exerted by the weight of the lip plate 10. As the lip plate 10 approaches the raised position 30, the amount of the biasing force 52 exerted by the spring assist assembly 34 also decreases so that the overcoming force 120 can remain substantially consistent through the rotational path 60 of the lip plate 10. It is contemplated that at certain positions of the lip plate 10, the spring assist assembly 34 may exert no biasing force 52 against the lip plate 10. Additionally, where the raised position 30 of the lip plate 10 is moved past vertical, the spring assist assembly 34 may be configured to exert a negative biasing force 100 such that the substantially consistent overcoming force 120 may be in the form of a pushing force exerted by the user to move the lip plate 10 away from the raised position 30, past vertical, and toward the lowered position 32. Through the use of the spring assist assembly 34, calibration of the base ends 40 and compression ends 42 of each of the springs 36 can be tuned in order to provide a biasing-force profile that allows for the consistent overcoming force 120 to be exerted by the user for operating the lip plate 10 between the raised and lowered positions 30, 32.

Referring now to FIGS. 1-6, having described various aspects of the device, a method 400 is disclosed for operating a dock leveler 12. According to the method 400, the spring assist assembly 34 is attached to a lip plate 10 and deck plate for an elevating dock leveler 12 (step 402). As discussed above, the lip plate 10 is rotationally operable relative to the deck plate through a rotational path 60 between the lowered and raised positions 32, 30 of the lip plate 10. A base end 40 of a first spring 150 is adjusted to define a first engagement position 210 with respect to the rotational path 60 (step 404). A base end 40 of the second spring 152 is also adjusted to define a second engagement position 212 with respect to the rotational path 60 (step 406). The second engagement position 212 is typically different than the first engagement position 210. Additionally, at least the first and second engagement positions 210, 212 cooperatively define the sequenced engagement 70 of the spring assist assembly 34. According to various aspects of the device, where a third spring 154 is included, the base end 40 of the third spring 154 can also be calibrated to define a third engagement position 214 that can add to the sequenced engagement 70 of the spring assist assembly 34. According to the method 400, a compression end 42 of the first spring 150 is adjusted to define a first biasing profile 216 with respect to the rotational path 60 (step 408). According to the method 400, a step 410 can include adjusting the compression end 42 of a second spring 152 to define the second biasing profile 218 with respect to the rotational path 60. This second biasing profile 218 is typically different than the first biasing profile 216. Additionally, at least the first and second biasing profiles 216, 218 cooperatively define the sequenced biasing engagement 82 of the spring assist assembly 34. The sequenced engagement 70 and the sequenced biasing engagement 82 of the spring assist assembly 34 cooperatively define a substantially consistent upward biasing force 74 that is exerted against the lip plate 10 and through the rotational path 60 toward the raised position 30. As discussed above, a third spring 154 may be included within the spring assist assembly 34. In such an embodiment, the compression end 42 of the third spring 154 may also be calibrated to define a third biasing profile 220 with respect to the rotational path 60. This third biasing force 52 can be combined with the first and second biasing forces 52 to define the sequenced biasing engagement 82 of the spring assist assembly 34. Within each profile of the first, second and third biasing profiles 216, 218, 220, the magnitude of the biasing force 52 can change, depending on the effective length 92 of each spring 36. Additionally, as each spring 36 becomes more compressed, the magnitude of biasing force 52 can also increase within each biasing profile. In various aspects of the device, the spring assist assembly 34 can include three springs 36 and can also include, potentially, additional springs 36 depending upon the design of the device and the design of the particular dock leveler 12.

According to the various aspects of the device, the spring assist assembly 34 is configured to be a single device that can be used in connection with a wide range of rotating dock levelers, elevating dock levelers 12, lip plates 10, and other dock leveling mechanisms. Additionally, the spring assist assembly 34 is configured to be adjustable such that it can be used in connection with a wide range of sizes of lip plates 10 in a variety of applications.

According to various aspects of the device, the calibration of the various springs 36 of the spring assist assembly 34 is intended to provide that the springs 36 are not energized or significantly compressed when the lip plate 10 is in a stored position or the raised position 30. As discussed above, when the dock leveler 12 lip plate 10 is in the raised position 30, the spring assist assembly 34 may be in a position such that none of the springs 36 are in engagement with the base plate 44 and no additional biasing force 52 is exerted against the lip plate 10.

In various aspects of the device, the desired pull force or overcoming force 120 needed along each rotational position 72 of the rotational path 60 of the lip plate 10 can be calculated based upon a particular formula. This formula can be in the form of:

$$\text{Pull force } T_a = \frac{\text{Lip length} \times W \times \text{Cos}(a)}{2H_a}$$

$$W = \text{lip weight}$$

$$H = \text{pull chain height}$$

Using this formula, or other similar formulas, the biasing force 52 necessary to be exerted by the spring assist assembly 34 can be calibrated to achieve the desired pull force at each position of the rotational path 60 for the lip plate 10. Using this formula, the rotational path 60 of the lip plate 10 can be calibrated where the chain or other mechanism engages the lip plate 10.

In various aspects of the device, the spring assist assembly 34 can be purchased as a kit that includes the spring assist assembly 34 with the various springs 36 detached from the calibrating posts 38. During installation of the spring assist assembly 34, the appropriate springs 36 can be attached to the calibrating posts 38 and the threaded mechanisms 94 can be adjusted and otherwise calibrated to provide the proper linear biasing force 52 that can be exerted by the spring assist assembly 34.

As discussed above, the spring assist assembly 34 is configured to be a single mechanism that can be used along a wide range of dock leveling mechanisms and sizes of dock leveling mechanisms.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A dock leveler comprising:
   a lip plate that is rotationally attached to an edge of a deck at a hinge and operable between raised and lowered positions, wherein the lowered position is generally parallel with the deck and the raised position is more than 90 degrees from the lowered position; and
   a spring assist assembly extending between the deck and the lip plate, the spring assist assembly including a plurality of springs that linearly operate along respective calibrating posts to operate a single linkage member to bias the lip plate toward a vertical position from each of the lowered and raised positions, wherein a base end and a compression end of each spring is adjustable along the respective calibrating posts, and wherein one spring of the plurality of springs is adjusted at the base and compression ends to exert an upward biasing force that biases the lip plate from the lowered position toward the vertical position and also exert an opposing negative biasing force that biases the lip plate from the raised position toward the vertical position, wherein the upward biasing force is defined by the one spring being in compression and the opposing negative biasing force is defined by the one spring being in tension.

2. The dock leveler of claim 1, wherein operation of the lip plate between the raised and lowered positions defines a rotational path of the lip plate and a linear path of the plurality of springs and the respective calibrating posts.

3. The dock leveler of claim 2, wherein calibration of the base end for each spring of the plurality of springs defines a sequenced engagement of the plurality of springs with respect to the linear path and the rotational path, and wherein calibration of the compression ends for the plurality of springs defines a sequenced biasing force of the plurality of springs with respect to the linear path and the rotational path.

4. The dock leveler of claim 2, wherein the spring assist assembly includes a base plate that is coupled to the deck and a biasing plate that is coupled to the respective calibrating posts, and wherein the base plate links the respective calibrating posts to the single linkage member.

5. The dock leveler of claim 4, wherein the calibrating posts extend from the biasing plate.

6. The dock leveler of claim 4, wherein the single linkage member extends from an outward surface of the biasing plate to the lip plate.

7. The dock leveler of claim 6, wherein the lip plate includes a linkage plate that rotationally attaches to the single linkage member.

8. The dock leveler of claim 7, wherein operation of the lip plate between a raised position and a lowered position rotationally operates the linkage plate through the rotational path and operates the single linkage member through the linear path with respect to the base plate.

9. The dock leveler of claim 4, wherein the respective calibrating posts include first, second and third calibrating posts that are set in a parallel configuration with respect to one another and a substantially perpendicular configuration with respect to the base plate.

10. The dock leveler of claim 9, wherein each of the first, second and third calibrating posts includes a dedicated spring of the plurality of springs.

11. The dock leveler of claim 1, wherein the base ends and the compression ends are each threadedly operable along the respective calibrating posts.

12. The dock leveler of claim 3, wherein the sequenced engagement and the sequenced biasing force of the plurality of springs defines a substantially consistent overcoming force that is sufficient to bias the lip plate to the lowered position.

13. A dock leveler comprising:
a lip plate rotationally attached to a horizontally-oriented deck and defining a rotational path between raised and lowered positions, wherein a vertical position is defined between the raised and lowered positions; and
a spring assist assembly extending between the horizontally-oriented deck and the lip plate and including a plurality of springs that linearly and cooperatively operate a single linkage member to bias the lip plate toward the vertical position from each of the raised and lowered positions; wherein:
a base end and a compression end of each spring are adjustable along respective calibrating posts;
calibration of the base end for each spring of the plurality of springs defines a sequenced engagement of the plurality of springs with respect to the rotational path;
calibration of the compression ends of the plurality of springs defines a sequenced biasing force of the plurality of springs with respect to the rotational path;
the sequenced engagement and the sequenced biasing force cooperatively defines a substantially consistent upward rotational force exerted by the lip plate through the rotational path and toward the vertical position; and
wherein all of the springs of the plurality of springs are in compression in the lowered position to exert an upward biasing force on the lip plate and at least one of the springs of the plurality of springs is in tension in the raised position to exert an opposing negative biasing force on the lip plate.

14. The dock leveler of claim 13, wherein operation of the lip plate through the rotational path and between the raised and lowered positions defines a linear path of the plurality of springs and the respective calibrating posts.

15. The dock leveler of claim 14, wherein the spring assist assembly includes a base plate that is coupled to the horizontally-oriented deck and a biasing plate that is coupled to the respective calibrating posts.

16. The dock leveler of claim 15, wherein the calibrating posts extend from the biasing plate and the single linkage member extends from an outward surface of the biasing plate to the lip plate.

17. The dock leveler of claim 16, wherein the lip plate includes a linkage plate that rotationally attaches to the single linkage member, wherein operation of the lip plate between a raised position and a lowered position rotationally operates the linkage plate through the rotational path and operates the single linkage member through the linear path with respect to the base plate.

18. The dock leveler of claim 15, wherein the respective calibrating posts include first, second and third calibrating posts that are set in a parallel configuration with respect to one another and a substantially perpendicular configuration with respect to the base plate.

19. The dock leveler of claim 18, wherein each of the first, second and third calibrating posts includes a dedicated spring of the plurality of springs, wherein the base ends and the compression ends are each threadedly operable along the respective calibrating posts, wherein one spring of the plurality of springs is adjusted at the base and compression ends to exert an upward biasing force that biases the lip plate from the lowered position to the vertical position and also exert a negative biasing force that biases the lip plate from the raised position to the vertical position, the upward biasing force and the negative biasing force being exerted through the single linkage member.

20. A method for operating a dock leveler, the method comprising steps of:
attaching a spring assist assembly to a lip plate and a deck plate for the dock leveler, wherein the lip plate is rotationally operable relative to the deck plate through a rotational path between lowered and raised positions, wherein a vertical position is defined between the lowered and raised positions;
adjusting a base end of a first spring to define a first engagement position with respect to the rotational path;
adjusting a base end of a second spring to define a second engagement position with respect to the rotational path, the second engagement position being different than the first engagement position, wherein at least the first and second engagement positions cooperatively define a sequenced engagement of the spring assist assembly;
adjusting a compression end of the first spring to define a first biasing profile with respect to the rotational path; and
adjusting a compression end of the second spring to define a second biasing profile with respect to the rotational path, the second biasing force being different than the first biasing force, wherein the first biasing profile of the first spring exerts a compression-based upward biasing force that biases the lip plate from the lowered position toward the vertical position and also exerts a tension-based opposing negative biasing force that biases the lip plate from the raised position toward the vertical position, wherein at least the first and second biasing profiles cooperatively define a sequenced biasing engagement of the spring assist assembly, and wherein the sequenced engagement and the sequenced biasing engagement cooperatively defines a substantially consistent upward rotational force exerted by the lip plate through the rotational path and toward the vertical position from each of the lowered position and the raised position.

* * * * *